(12) United States Patent
Martin et al.

(10) Patent No.: US 9,296,390 B2
(45) Date of Patent: Mar. 29, 2016

(54) HYBRID VEHICLE EXHAUST DIAGNOSTICS

(71) Applicant: Ford Global Technologies, LLC, Dearborn, MI (US)

(72) Inventors: Douglas Raymond Martin, Canton, MI (US); Richard Paul Taylor, Sterling Heights, MI (US); Matthew D. Smith, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 413 days.

(21) Appl. No.: 13/841,206

(22) Filed: Mar. 15, 2013

(65) Prior Publication Data

US 2014/0277998 A1    Sep. 18, 2014

(51) Int. Cl.

| | |
|---|---|
| *F02D 41/14* | (2006.01) |
| *F01N 11/00* | (2006.01) |
| *B60W 20/00* | (2006.01) |
| *F02D 41/22* | (2006.01) |
| *F01N 9/00* | (2006.01) |

(52) U.S. Cl.
CPC .............. *B60W 20/50* (2013.01); *F01N 11/00* (2013.01); *F01N 11/007* (2013.01); *F02D 41/1495* (2013.01); *F02D 41/222* (2013.01); *F01N 9/00* (2013.01); *F02D 41/1475* (2013.01); *Y02T 10/47* (2013.01); *Y10S 903/904* (2013.01)

(58) Field of Classification Search
CPC ... F02D 41/222; F02D 41/22; F02D 41/1458; F02D 41/1454; F02D 41/1456; F02D 41/1475; F02D 41/1476; F02D 41/1495; F01N 11/00; F01N 11/007; F01N 9/00
USPC ............ 123/672, 320, 325, 332, 333, 339.12, 123/394, 443, 23.31, 23.32, 675, 682, 690, 123/198 F; 73/1.06, 114.73; 701/109, 110, 701/112; 60/276, 277; 180/65.28, 65.21
See application file for complete search history.

(56) References Cited

U.S. PATENT DOCUMENTS

| | | | | |
|---|---|---|---|---|
| 5,845,489 | A * | 12/1998 | Dohta et al. ..................... | 60/276 |
| 6,446,614 | B1 | 9/2002 | Matsuoka et al. | |
| 6,522,024 | B1 * | 2/2003 | Takaoka et al. ............. | 290/40 C |
| 6,581,371 | B1 * | 6/2003 | Orzel et al. ..................... | 60/277 |
| 7,254,474 | B2 * | 8/2007 | Iihoshi et al. ................. | 701/109 |
| 7,769,534 | B1 * | 8/2010 | Xu et al. ........................ | 701/109 |
| 8,712,667 | B2 * | 4/2014 | Nakano et al. ................ | 701/103 |
| 2001/0010220 | A1 * | 8/2001 | Shinjyo et al. ................ | 123/690 |
| 2003/0061803 | A1 * | 4/2003 | Iihoshi et al. ................... | 60/285 |
| 2003/0140680 | A1 * | 7/2003 | Nagashima et al. .......... | 73/23.32 |
| 2007/0149349 | A1 * | 6/2007 | Utsumi et al. .................... | 477/3 |
| 2008/0059013 | A1 * | 3/2008 | Liu et al. .......................... | 701/22 |
| 2008/0184695 | A1 * | 8/2008 | Anilovich et al. .............. | 60/274 |
| 2008/0302087 | A1 * | 12/2008 | Genslak et al. ................. | 60/277 |
| 2010/0242569 | A1 * | 9/2010 | Kerns et al. ..................... | 73/1.06 |
| 2010/0242933 | A1 * | 9/2010 | Anilovich et al. ............. | 123/672 |
| 2011/0054764 | A1 * | 3/2011 | Watson .......................... | 701/109 |
| 2011/0106411 | A1 * | 5/2011 | Anilovich et al. ............. | 701/109 |
| 2011/0120095 | A1 * | 5/2011 | Wald et al. ....................... | 60/276 |

(Continued)

*Primary Examiner* — Lindsay Low
*Assistant Examiner* — George Jin
(74) *Attorney, Agent, or Firm* — David Kelley; Alleman Hall McCoy Russell & Tuttle LLP

(57) ABSTRACT

Methods are provided for performing diagnostic routines in a hybrid vehicle. In one example approach, a method for operating a hybrid vehicle comprises inhibiting engine shutdown and enabling deceleration fuel shut off to perform a monitoring test while a vehicle speed is above a threshold speed.

16 Claims, 4 Drawing Sheets

(56) References Cited

U.S. PATENT DOCUMENTS

| | | | |
|---|---|---|---|
| 2011/0192146 A1* | 8/2011 | Sugimoto et al. | 60/276 |
| 2011/0225951 A1* | 9/2011 | Sato | 60/274 |
| 2012/0186564 A1* | 7/2012 | Vigild et al. | 123/559.1 |
| 2013/0054060 A1* | 2/2013 | Dupuy | 701/22 |
| 2013/0054083 A1* | 2/2013 | Genslak et al. | 701/30.5 |
| 2013/0184907 A1* | 7/2013 | Whitney et al. | 701/22 |

\* cited by examiner

HYBRID VEHICLE EXHAUST DIAGNOSTICS

BACKGROUND AND SUMMARY

Reduced engine operation times in hybrid vehicles enable fuel economy and reduced fuel emissions benefits. However, the shorter engine operation times can lead to insufficient time for completion of various on-board diagnostic operations. These may include, for example, diagnostics for various engine exhaust sensors, exhaust catalyst monitoring, etc.

One example approach to enable completion of on-board diagnostic routines involves maintaining or resuming engine operation for a duration to complete the routines. Another example approach is shown by Matsuoka et al. in U.S. Pat. No. 6,446,61 wherein an engine is held in a steady-state during engine operation so that a diagnostic routine can run.

The inventors herein have recognized issues with such approaches. For example, starting an engine or maintaining an engine at steady state to perform diagnostic routines may be intrusive to vehicle operation and may negatively impact customer perception of engine run time in a hybrid vehicle. Further, fuel efficiency may be reduced in approaches which indiscriminately start or extend engine run time in order to complete diagnostic tests while the hybrid vehicle is in operation.

Further, it may be desirable to perform deceleration fuel shut off (DFSO), where fuel supply is discontinued to the engine, in order to expose a sensor or catalyst to greater extremes of air/fuel mixtures in order to ensure high-confidence failure code settings when diagnosing faults in exhaust system components, such as air/fuel sensors and catalysts. Due to the minimal engine running time for hybrid vehicles, e.g., such vehicles may be configured to shut the engine down in response to driver tip-outs, exhaust sensors in the exhaust system may not be adequately exposed to rich and lean air/fuel mixtures needed for monitoring.

In one example, some of the above issues may be addressed by a method for operating a hybrid vehicle comprising inhibiting engine shutdown and enabling deceleration fuel shut off to perform a monitoring test while a vehicle speed is above a threshold speed.

In this way, diagnostic routines may be performed using DFSO to adequately expose exhaust sensors to rich and lean air/fuel mixtures in order to more accurately diagnose exhaust system components while reducing intrusiveness of the monitoring routines on vehicle operation. Further, in such an approach, fuel economy may be increased by inhibiting engine pull-downs only when the diagnostic monitor is ready. Further, by not causing the engine to stay on below threshold speeds, customer satisfaction with hybrid vehicle operation may increase. For example, the monitor will not intrude into the noticeable low-speed area of vehicle operation, even with a suspect sensor.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
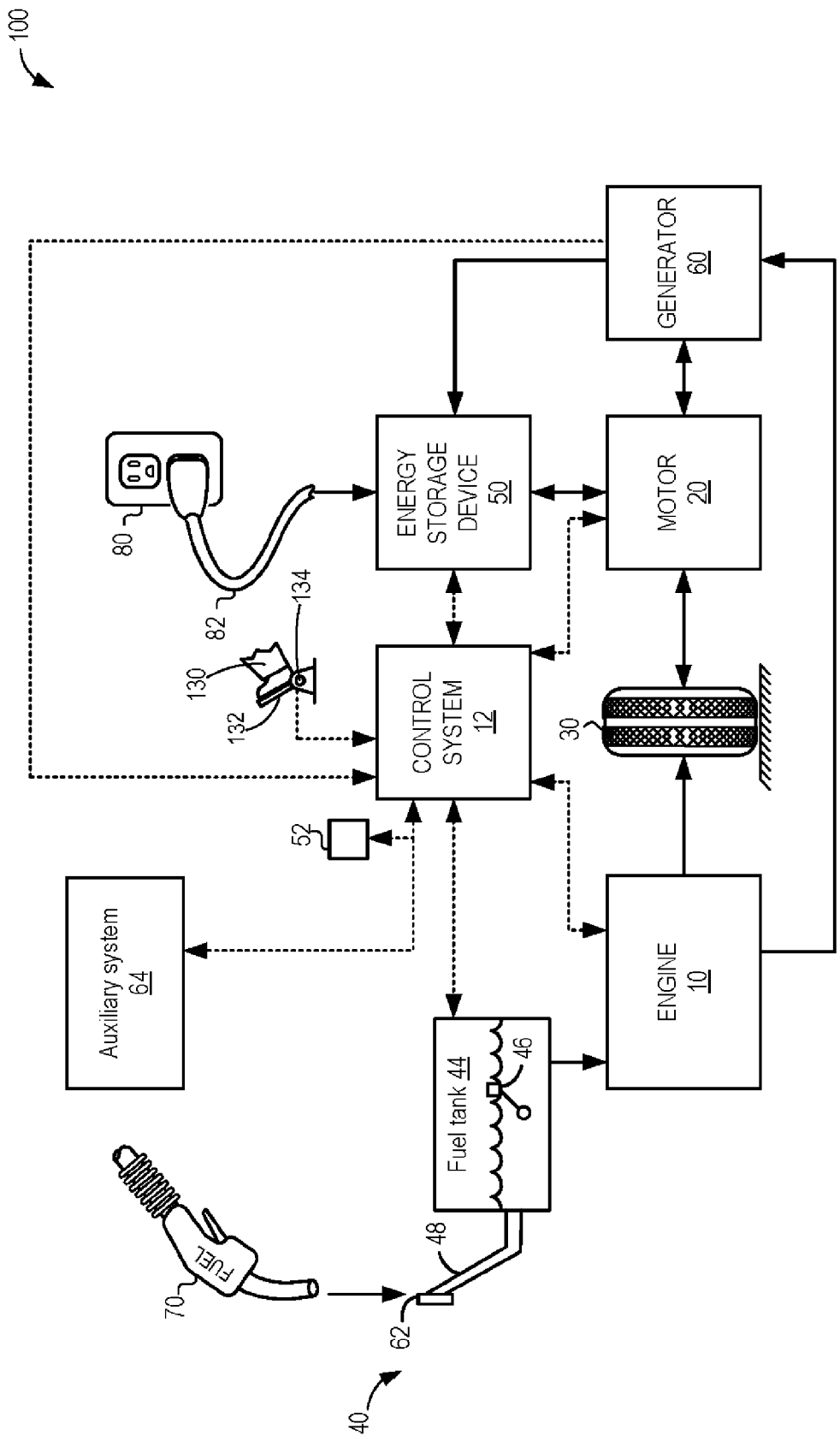
FIG. 1 shows an example vehicle system.

The following description relates to systems and methods for operating a hybrid electric vehicle, such as the plug-in hybrid electric vehicle of FIG. 1. Such hybrid vehicles may include an engine, such as the engine shown in FIG. 2, which may be selectively operated during certain conditions. For example, the engine may be operated or "pulled-up" to meet torque requests but may be shut-down, or "pulled-down", during other conditions. For example, the engine may be pulled-down in response to a driver tip-out, where the driver discontinues or reduces a torque request, e.g., by adjusting an accelerator pedal. An engine pull-up it where the engine is spun by a generator to a target RPM, e.g., ~1000 RPM, and fueled and sparked on the way up to start the engine. However, engine pull-ups are independent from a vehicle start which may occur via an alternative power source in a hybrid vehicle. An engine pull-down is where the engine is stopped, but the vehicle is still running.

Figure 3:
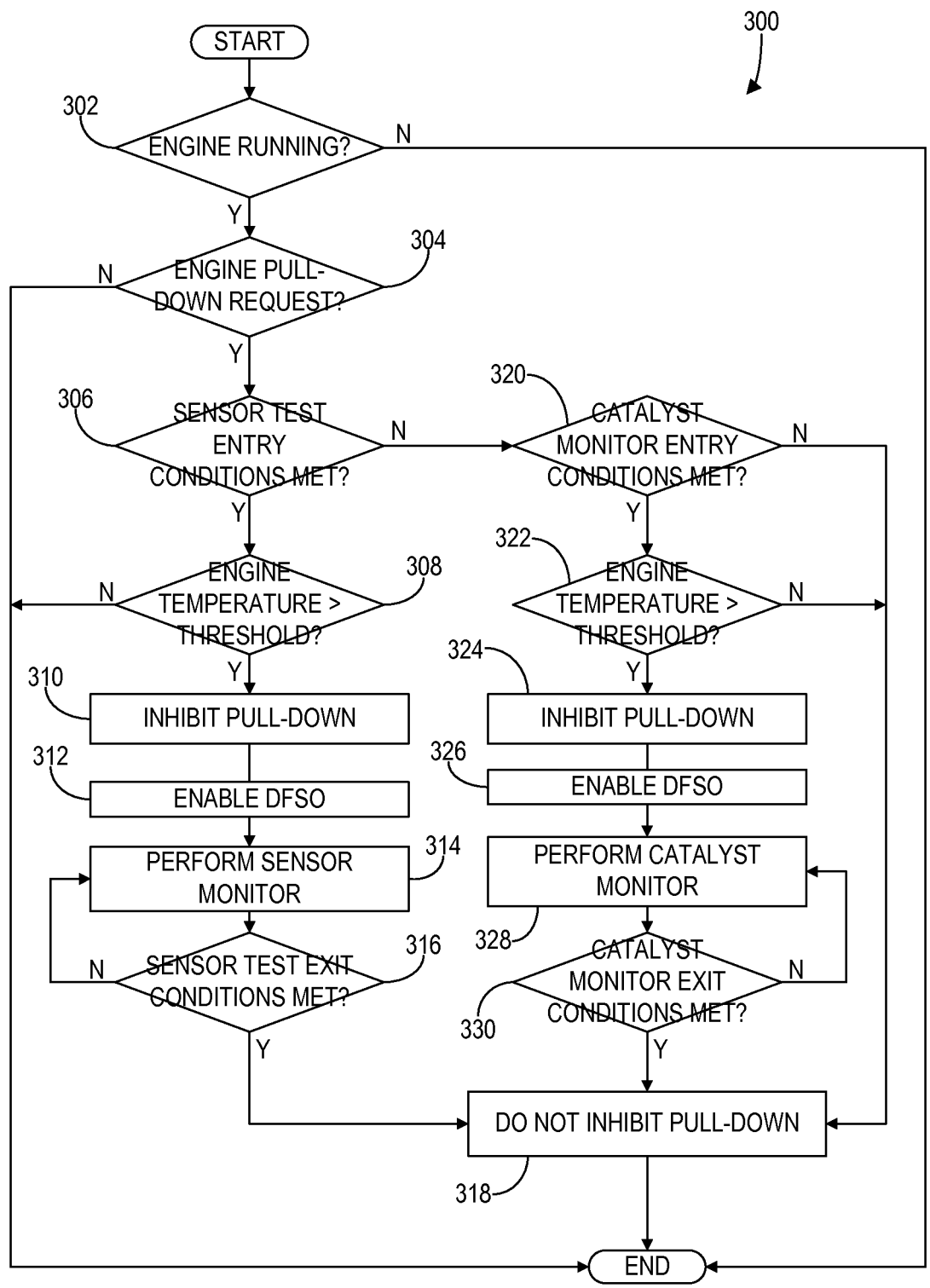
FIG. 3 shows an example method for operating a hybrid vehicle, in accordance with the disclosure.
Figure 4:
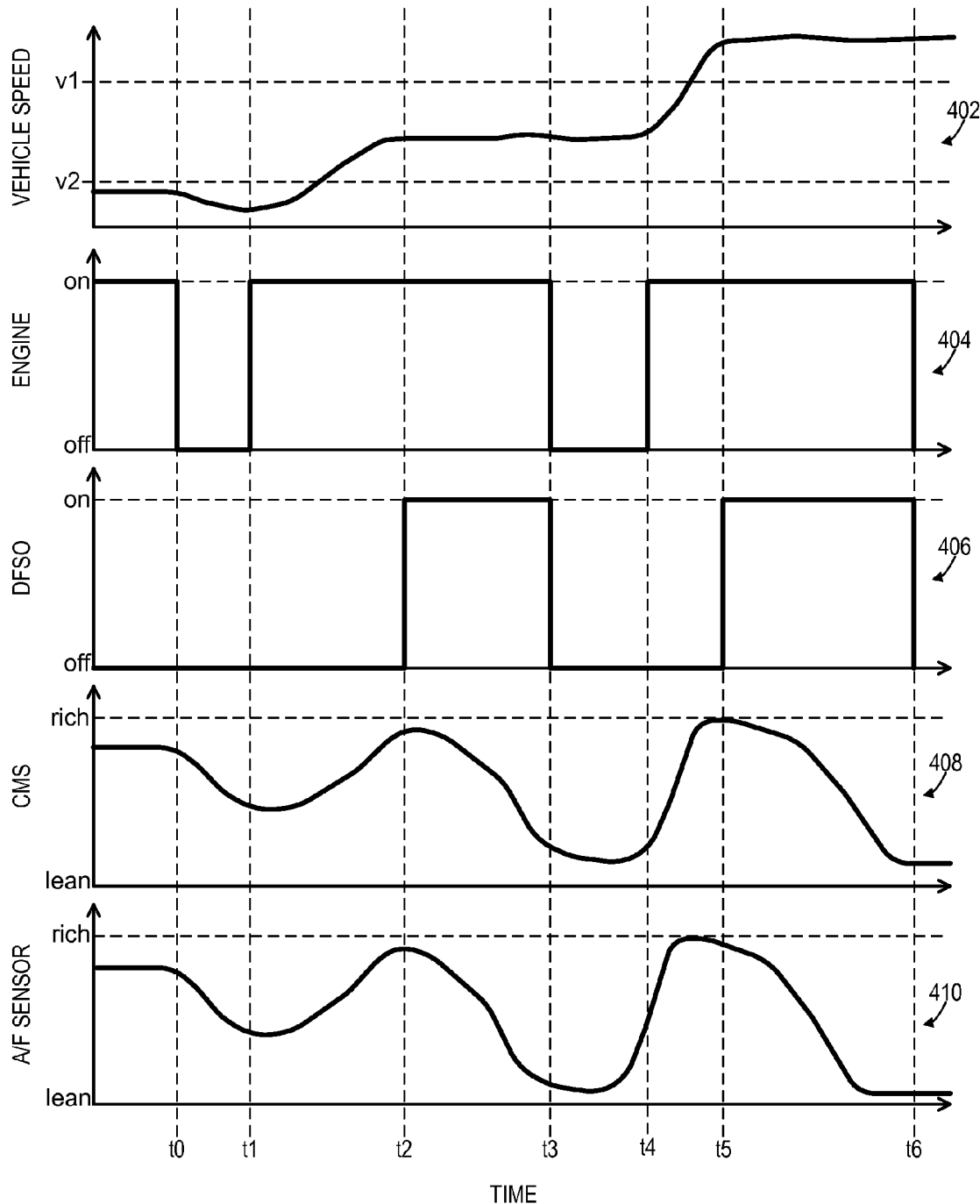
FIG. 4 illustrates an example method for operating a hybrid vehicle, in accordance with the disclosure.

As remarked above, since hybrid vehicles may have reduced engine run-time, diagnostic tests of sensors and catalysts may not have sufficient time to run to completion and may not be adequately exposed to air/fuel transitions needed to accurately diagnose exhaust system components while reducing intrusiveness of the monitoring routines on vehicle operation. Thus, as shown in FIGS. 3 and 4, during certain non-intrusive conditions, an engine pull-down may be inhibited and deceleration fuel shut off (DFSO) may be enabled while the vehicle is running in order to complete diagnostic tests on exhaust system components such as exhaust sensors and catalysts. For example, engine pull-down may be inhibited and deceleration fuel shut off (DFSO) may be enabled only when the diagnostic monitor is ready and a speed of the vehicle is greater than a threshold speed.

FIG. 1 illustrates an example vehicle propulsion system 100. Vehicle propulsion system 100 includes a fuel burning engine 10 and a motor 20. As a non-limiting example, engine 10 comprises an internal combustion engine and motor 20 comprises an electric motor. Motor 20 may be configured to utilize or consume a different energy source than engine 10. For example, engine 10 may consume a liquid fuel (e.g. gasoline) to produce an engine output while motor 20 may consume electrical energy to produce a motor output. As such, a vehicle with propulsion system 100 may be referred to as a hybrid electric vehicle (HEV). Specifically, propulsion system 100 is depicted herein as a plug-in hybrid electric vehicle (PHEV).

Vehicle propulsion system 100 may be operated in a variety of different modes depending on vehicle operating conditions. Some of these modes may enable engine 10 to be maintained in an off state (or deactivated state) where combustion of fuel at the engine is discontinued. For example, under select operating conditions, motor 20 may propel the vehicle via drive wheel 30 while engine 10 is deactivated.

During other operating conditions, engine 10 may be deactivated while motor 20 is operated to charge energy storage device 50 via regenerative braking. Therein, motor 20 may receive wheel torque from drive wheel 30 and convert the kinetic energy of the vehicle to electrical energy for storage at energy storage device 50. Thus, motor 20 can provide a generator function in some embodiments. However, in other embodiments, a dedicated energy conversion device, herein generator 60 may instead receive wheel torque from drive wheel 30 and convert the kinetic energy of the vehicle to electrical energy for storage at energy storage device 50.

During still other operating conditions, engine 10 may be operated by combusting fuel received from fuel system 40. For example, engine 10 may be operated to propel the vehicle via drive wheel 30 while motor 20 is deactivated. During other operating conditions, both engine 10 and motor 20 may each be operated to propel the vehicle via drive wheel 30. A configuration where both the engine and the motor may selectively propel the vehicle may be referred to as a parallel type vehicle propulsion system. Note that in some embodiments, motor 20 may propel the vehicle via a first set of drive wheels and engine 10 may propel the vehicle via a second set of drive wheels.

In other embodiments, vehicle propulsion system 100 may be configured as a series type vehicle propulsion system, whereby the engine does not directly propel the drive wheels. Rather, engine 10 may be operated to power motor 20, which may in turn propel the vehicle via drive wheel 30. For example, during select operating conditions, engine 10 may drive generator 60, which may in turn supply electrical energy to one or more of motor 20 or energy storage device 50. As another example, engine 10 may be operated to drive motor 20 which may in turn provide a generator function to convert the engine output to electrical energy, where the electrical energy may be stored at energy storage device 50 for later use by the motor. The vehicle propulsion system may be configured to transition between two or more of the operating modes described above depending on operating conditions.

Fuel system 40 may include one or more fuel storage tanks 44 for storing fuel on-board the vehicle and for providing fuel to engine 10. For example, fuel tank 44 may store one or more liquid fuels, including but not limited to: gasoline, diesel, and alcohol fuels. In some examples, the fuel may be stored on-board the vehicle as a blend of two or more different fuels. For example, fuel tank 44 may be configured to store a blend of gasoline and ethanol (e.g. E10, E85, etc.) or a blend of gasoline and methanol (e.g. M10, M85, etc.), whereby these fuels or fuel blends may be delivered to engine 10. Still other suitable fuels or fuel blends may be supplied to engine 10, where they may be combusted at the engine to produce an engine output. The engine output may be utilized to propel the vehicle and/or to recharge energy storage device 50 via motor 20 or generator 60.

Fuel tank 44 may include a fuel level sensor 46 for sending a signal regarding a fuel level in the tank to control system (or controller) 12. Fuel level sensor 46 may comprise a float connected to a variable resistor, as shown. Alternatively, other types of fuel level sensors may be used. The level of fuel stored at fuel tank 44 (e.g. as identified by the fuel level sensor) may be communicated to the vehicle operator, for example, via a fuel gauge or indication lamp indicated at 52. Fuel system 40 may periodically receive fuel from an external fuel source. For example, in response to a fuel level in the fuel tank falling below a threshold, a fuel tank refill request may be made and the vehicle operator may stop the vehicle for refilling. Fuel may be pumped into the fuel tank from fuel dispensing device 70 via a refueling line 48 that forms a passageway from a refueling door 62 located on an outer body of the vehicle.

As such, vehicle system may include various sensors and monitors that need periodic assessment. These may include, for example, a VCT monitor, an EGR monitor, an EGO sensor, a fuel monitor, an air-fuel ratio imbalance monitor, an FAOS sensor, as well as other routines such as leak detection routines. Periodic on-board diagnostic routines may be performed to confirm sensor/monitor functionality. In addition, to meet federal emissions requirements, on-board diagnostic (OBD) routines may need to be completed within a vehicle drive cycle. As such, some of the diagnostic routines may require the engine to be in operation for completion. Still others may not need engine operation and may be performed during a drive cycle while a vehicle is in an electric mode. At least some of the diagnostic routines may be opportunistically completed as engine operation varies between engine-on operation and engine-off operation during a vehicle drive cycle. For example, as shown in FIGS. 3 and 4, during certain non-intrusive conditions, an engine pull-down may be inhibited and deceleration fuel shut off (DFSO) may be enabled while the vehicle is running in order to complete diagnostic tests on exhaust system components such as exhaust sensors and catalysts. For example, engine pull-down may be inhibited and deceleration fuel shut off (DFSO) may be enabled only when the diagnostic monitor is ready and a speed of the vehicle is greater than a threshold speed.

Control system 12 may communicate with one or more of engine 10, motor 20, fuel system 40, energy storage device 50, and generator 60. Specifically, control system 12 may receive feedback from one or more of engine 10, motor 20, fuel system 40, energy storage device 50, and generator 60 and send control signals to one or more of them in response. Control system 12 may also receive an indication of an operator requested output of the vehicle propulsion system from a vehicle operator 130. For example, control system 12 may receive feedback from pedal position sensor 134 which communicates with pedal 132. Pedal 132 may refer schematically to an accelerator pedal (as shown) or a brake pedal.

Energy storage device 50 may include one or more batteries and/or capacitors. Energy storage device 50 may be configured to store electrical energy that may be supplied to other electrical loads residing on-board the vehicle (other than the motor), including a cabin heating and air conditioning system (e.g., HVAC system), an engine starting system (e.g., starter motor), headlights, cabin audio and video systems, etc.

Energy storage device 50 may periodically receive electrical energy from an external power source 80 not residing in the vehicle. As a non-limiting example, vehicle propulsion system 100 may be configured as a plug-in hybrid electric vehicle (HEV), whereby electrical energy may be supplied to energy storage device 50 from power source 80 via an electrical energy transmission cable 82. During a recharging operation of energy storage device 50 from power source 80, electrical transmission cable 82 may electrically couple energy storage device 50 and power source 80. While the vehicle propulsion system is operated to propel the vehicle, electrical transmission cable 82 may be disconnected between power source 80 and energy storage device 50. Control system 12 may estimate and/or control the amount of electrical energy stored at the energy storage device, referred to herein as the state of charge (SOC).

In other embodiments, electrical transmission cable 82 may be omitted, where electrical energy may be received wirelessly at energy storage device 50 from power source 80. For example, energy storage device 50 may receive electrical energy from power source 80 via one or more of electromagnetic induction, radio waves, and electromagnetic resonance. As such, it should be appreciated that any suitable approach may be used for recharging energy storage device 50 from the external power source 80. In this way, motor 20 may propel the vehicle by utilizing an energy source other than the fuel utilized by engine 10.

Figure 2:
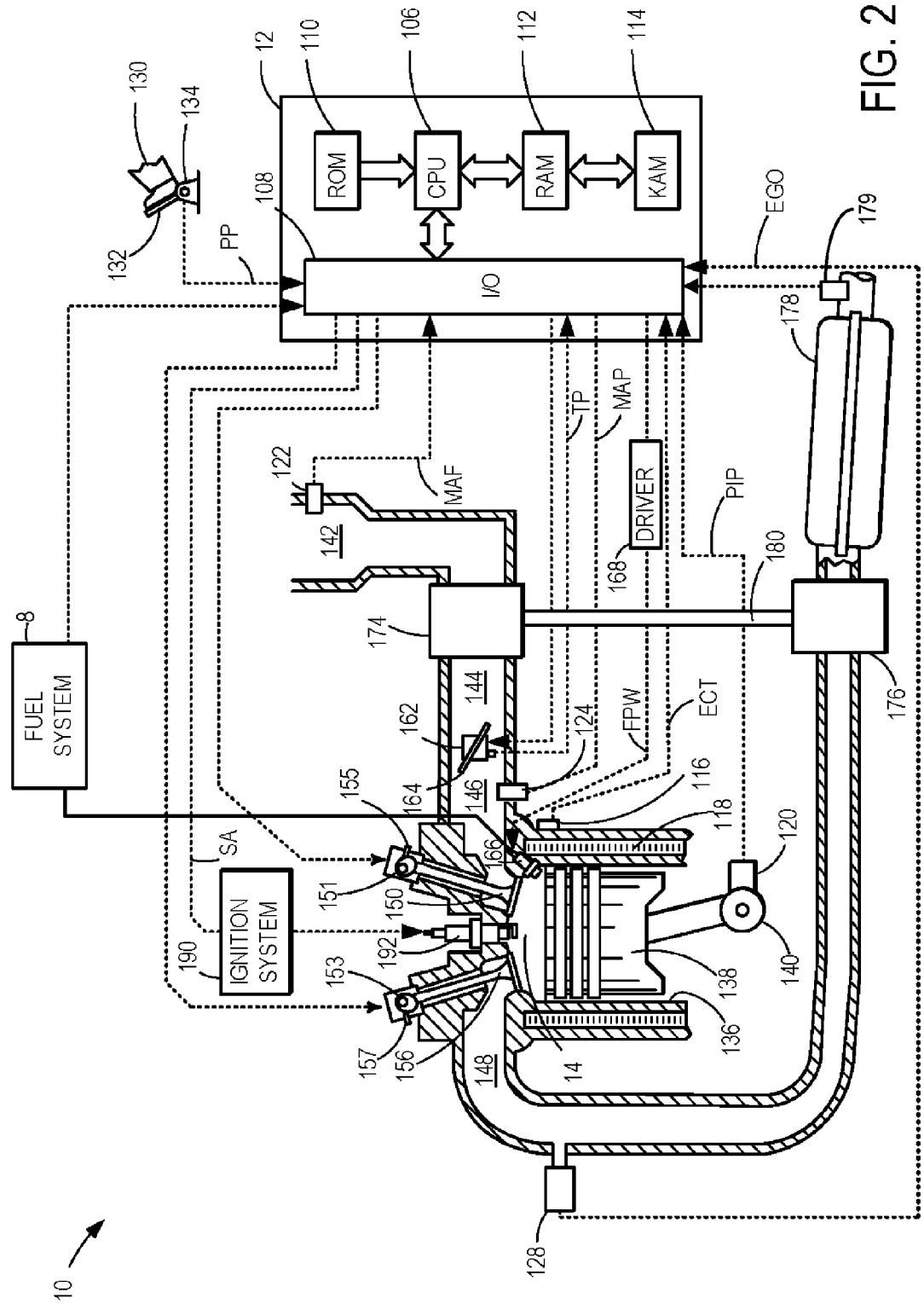
FIG. 2 shows an example engine.

As elaborated in FIG. 2, controller 12 may receive input data from various sensors, process the input data, and trigger various actuators in response to the processed input data based on instruction or code programmed therein corresponding to one or more routines. An example control routine is described herein with regard to FIG. 3.

FIG. 2 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 2, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof. Further, a downstream catalyst monitor sensor (CMS) 179 may be coupled in the exhaust at a position downstream of catalyst 178. Sensor 179 may be selected from among various suitable sensors for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor, for example.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

As described above, FIG. 2 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, different fuel volatilities, and/or combinations thereof etc.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Storage medium read-only memory 110 can be programmed with computer readable data representing instructions executable by processor 106 for performing the methods and routines described below as well as other variants that are anticipated but not specifically listed. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, exhaust AFR from CMS 179, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Based on input from one or more of the above-mentioned sensors, controller 12 may adjust one or more actuators, such as fuel injector 166, throttle 162, spark plug 192, intake/exhaust valves and cams, etc. The controller may receive input data from the various sensors, process the input data, and trigger the actuators in response to the processed input data based on instruction or code programmed therein corresponding to one or more routines. An example control routine is described herein with regard to FIG. 3.

FIG. 3 shows an example method 300 for inhibiting engine pull-downs and enabling DFSO during select vehicle operating conditions so that monitoring routines may be performed to diagnose exhaust system components. As described below, during select vehicle operating conditions, e.g., when a speed of the vehicle is greater than a threshold speed and when entry conditions for performing a monitoring routine are met, an engine shut-off may be postponed for a duration, fuel provided to the engine may be discontinued, and transitions from rich to lean air/fuel ratios through the exhaust system may be tracked to determine if a degradation is present in one or more exhaust system components, e.g., one or more sensors or catalysts. This fuel cut occurs at a time that would normally shut down the engine in a hybrid vehicle, e.g., in response to an engine pull-down request such as a driver tip-out. The engine must keep turning to move the lean transition through the exhaust and allow it to be observed by the monitor.

The sensor and catalyst monitoring routines described herein depend on transitions in air/fuel ratios through exhaust system components and thus depend on changes in engine operation while the engine is running. The engine will not be started or pulled-up just to perform a diagnostic test. Thus, at 302, method 300 includes determining if the engine is running. If the engine is running at 302, method 300 proceeds to 304.

At 304, method 300 determines if an engine pull-down request occurs. An engine pull-down request in a hybrid vehicle may occur in response to a variety of vehicle operating conditions. In one example, an engine pull-down request may include a driver tip-out where a torque request is discontinued or reduced via a driver input, e.g., via an accelerator pedal. As another example, an engine pull-down request may depend on vehicle load and/or vehicle speed. For example, an engine pull-down request may be generated in response to a vehicle load and/or vehicle speed less than a threshold. An engine pull-down request may be further generated based on operating conditions of the motor 20, operating conditions of the generator 50, and/or a state of charge of energy storage device 50. In some examples, an engine pull-down request may be generated every time a driver tip-out occurs.

If an engine pull-down request occurs at 304, method 300 proceeds to 306. At 306, method 300 includes determining if sensor test entry conditions are met. For example, an exhaust sensor test may be scheduled to be performed on one or more exhaust sensors in the exhaust of the vehicle. For example, exhaust sensor 128 may be periodically tested to determine whether or not its response to air/fuel ratio changes is substantially accurate.

Sensor test entry conditions may be based on a variety of engine and vehicle operating conditions as well as a sensor monitoring schedule. For example, if a sensor test has not been performed for a predetermined time period then a sensor test may be scheduled to occur at the next available opportunity when a pull-down request is initiated and other entry conditions are met. Further, sensor test entry conditions may be based on how long the engine has been running. Thus, sensor test entry conditions may include an engine run-time greater than a threshold duration.

Further still, sensor test entry conditions may be based on a speed of the vehicle, e.g., how fast the vehicle is being propelled in a forward or backward direction. For example, sensor test entry conditions may include a vehicle speed greater than a first threshold speed, e.g., greater than 47 mph. In this way, as described below, an engine pull-down may be inhibiting only when the vehicle speed is greater than this first threshold vehicle speed so that customer satisfaction with hybrid vehicle performance may be increased.

Further, entry conditions may be based on whether or not an engine pull-down is currently being inhibited and for how long the engine pull-down has been inhibited. For example, if the engine has been inhibited for a duration less than a threshold duration, e.g., less than 5 seconds, then the engine may continue to be inhibited to perform the sensor test as described below. However, if the engine has been inhibited for a duration greater than the threshold duration, e.g., more than 5 seconds, then the engine may be shut down and the monitoring routine may not occur. These entry conditions may be used to ensure that the engine is inhibited only during conditions when the sensor monitor is ready and vehicle conditions permit non-intrusive engine pull-down inhibition so that the engine does not remain on when it is not desired to be.

If sensor test entry conditions are met at 306, method 300 proceeds to 308. In some examples, at 308, method 300 may include determining if the engine temperature is greater than a threshold temperature. For example, engine coolant temperature, as determined by temperature sensor 116, may be used to determine if the engine temperature is greater than a threshold temperature. In this way method 300 may ensure that the engine is sufficiently warmed up to perform the monitoring routine.

If the engine temperature is not greater than the threshold temperature at 308, then method 300 proceeds to 318 to not inhibit engine pull-down. For example, in response to the engine pull-down request, engine operation may be discontinued while the vehicle remains in operation. However, if the engine temperature is greater than the threshold temperature at 308, then method 300 proceeds to 310.

At 310, method 300 includes inhibiting engine pull-down. For example, in response to the engine pull-down request, engine shut-down may be postponed for a duration so that the sensor test may be performed to diagnose faults in the sensor. In order to provide greater air/fuel fluctuations for the sensor monitor, while the engine pull-down is inhibited, at 312, method 300 includes enabling DFSO. Enabling DFSO may include discontinuing fuel supply to the engine while the engine is running and while the engine pull-down is inhibited. By initiating DFSO and inhibiting the engine pull-down a transition from rich to lean air/fuel ratio may be monitored by the exhaust gas sensor during the sensor test to diagnose the sensor as described below.

At 314, method 300 includes performing sensor monitoring. For example, the monitoring test may include monitoring a rich to lean transition at the air/fuel sensor in an exhaust of the vehicle. For example, while the engine pull-down is inhibited and DFSO is enabled, air/fuel sensor readings from exhaust gas sensor 128 may be monitored and sensor degradation may be indicated in response to the rich to lean transition at an air/fuel sensor. For example, the rich to lean transition at the sensor may be compared to an expected transition to determine whether the sensor is degraded. Further, in some examples, the rich to lean transition measured by the sensor may be compared to one or more predetermined transition patterns to diagnose a type of fault, if any, present at the sensor.

At 316, method 300 includes determining if sensor test exit conditions are met. Sensor test exit conditions may be based on an amount of time that the sensor test has been running while the engine pull-down is inhibited and DFSO is enabled. In some examples, the engine pull-down may be inhibited for a duration less than a threshold duration so that vehicle operation is not significantly impacted by keeping the engine on for a duration after a pull-down request. Further, in some examples, sensor test exit conditions may be based on whether the sensor test has completed or has acquired sufficient data to effectively diagnose the sensor. If sensor test exit conditions are not met at 316, method 300 continues performing the sensor monitor at 314.

However, if sensor test exit conditions are met at 316, method 300 proceeds to 318 to discontinue inhibiting the engine pull-down. For example, the engine may be shut down after the monitoring test is complete while the vehicle is still in operation. For example, after the sensor monitor is complete, engine operation to propel the vehicle may be discontinued and an auxiliary power source in the hybrid vehicle may instead be used to propel the vehicle at a non-zero speed or to keep the vehicle in operation.

Further, if an indication of sensor fault was found during the sensor test, then, in some examples, a notification may be sent to an onboard diagnostic device or an error code may be set to alert the driver of the vehicle to perform maintenance operations. Further, in some examples, if sensor degradation is detected then mitigating actions may be performed. For example, sensor readings by the degraded sensor may be adjusted based on a difference between a measured and expected transition so that a corrected sensor reading may be used to diagnose other exhaust system components, such as catalysts.

Returning to 306, if sensor test entry conditions are not met at 306, then method 300 proceeds to 320. At 320, method 300 includes determining if catalyst monitor entry conditions are met. Catalyst monitoring may be performed to determine whether or not a catalyst in the exhaust, e.g., catalyst 178, has degraded. For example, catalyst monitoring may be performed to determine a storage capacity or age of the catalyst.

As with sensor test entry conditions, catalyst monitor entry conditions may be based on a variety of engine and vehicle operating conditions as well as a catalyst monitoring schedule. For example, if a catalyst test has not been performed for a predetermined time period then a catalyst test may be scheduled to occur at the next available opportunity when a pull-down request is initiated and other catalyst monitor entry conditions are met. Further, catalyst monitor entry conditions may be based on how long the engine has been running. Thus catalyst monitor entry conditions may include an engine run-time greater than a threshold duration.

Further still, catalyst monitor entry conditions may be based on a speed of the vehicle. For example, catalyst monitor entry conditions may include a vehicle speed greater than a second threshold speed, e.g., greater than 27 mph. In some examples, this second threshold speed may be less than the first threshold speed used as an entry condition for a sensor test described above. In this way, as described below, an engine pull-down may be inhibiting only when the vehicle speed is greater than this second threshold vehicle speed so that customer satisfaction with hybrid vehicle performance may be increased. Further, entry conditions may be based on whether or not an engine pull-down is currently being inhibited and for how long the engine pull-down has been inhibited. For example, if the engine has been inhibited for a duration less than a threshold duration, e.g., less, than 5 seconds, then the engine may continue to be inhibited to perform the catalyst monitor as described below. These entry conditions may be used to ensure that the engine is inhibited only during conditions when the catalyst monitor is ready and vehicle conditions permit non-intrusive pull-down inhibition so that the engine does not remain on when it is not desired to be.

Catalyst monitor entry conditions may further be based on air/fuel sensor readings at sensors positioned upstream and/or downstream of the catalyst. For example, catalyst monitor entry conditions may include exhaust gas sensors upstream and downstream of the catalyst reading rich. For example, entry conditions for monitoring catalyst 178 may include upstream sensor 128 and downstream sensor 179 both reading substantially rich or bother reading a threshold amount of richness in the exhaust.

For example, the timing of the fuel cut may influence how big of an air-fuel swing will be observed by the catalyst monitor sensors. By starting the fuel when the upstream and downstream exhaust gas sensors are reading substantially rich, there will be a large difference measured, compared to cutting fuel when the upstream and downstream sensors are already reading lean. By starting when both the CMS 179 and the EGO sensor 128 both reading rich or richer than a threshold, the CMS reading will see first read rich then transition to reading lean after the fuel cut. This transition may be used to diagnose the catalyst. The engine must keep turning to move the lean transition through the exhaust and allow it to be observed by the monitor. The catalyst monitor is based on readings of CMS voltage from CMS 179. Thus, entry conditions for catalyst monitoring may include the CMS voltage greater than a rich threshold voltage.

If catalyst monitor entry conditions are not met at 320, then method 300 proceeds to 318 to not inhibit the engine pull-down. For example, in response to the engine pull-down request the engine is shut down and catalyst monitoring is not performed. For example, engine shutdown may not be inhibited when exhaust gas sensors upstream and downstream of the catalyst are reading lean. However, if catalyst monitor entry conditions are met at 320, then method 300 proceeds to 322.

At 322, method 300 may include determining if the engine temperature is greater than a threshold temperature. For example, engine coolant temperature, as determined by temperature sensor 116, may be used to determine if the engine temperature is greater than a threshold temperature. In this way method 300 may ensure that the engine is sufficiently warmed up to perform the monitoring routine. If the engine temperature is not greater than the threshold temperature at 322, then method 300 proceeds to 318 to not inhibit engine pull-down and to shut off the engine. However, if the engine temperature is greater than the threshold temperature at 322, then method 300 proceeds to 324.

At 324, method 300 includes inhibiting engine pull-down. For example, engine shutdown may be inhibited in response to exhaust gas sensors upstream and downstream of the catalyst reading rich. At 326, method 300 includes enabling DFSO. Enabling DFSO may include discontinuing fuel supply to the engine while the engine is running and while the engine pull-down is inhibited. By initiating DFSO and inhibiting the engine pull-down a transition from rich to lean air/fuel ratio may be monitored by the catalyst monitor sensors during the catalyst monitor to diagnose the catalyst as described below.

At 328, method 300 includes performing catalyst monitoring. For example, a rich to lean transition upstream and downstream of a catalyst in an exhaust of the vehicle may be monitored and catalyst degradation may be indicated based on the rich to lean transition downstream of a catalyst. For example, the rich to lean transition downstream of the catalyst may be compared to an expected transition to determine whether the catalyst is degraded, e.g., to determine an age or storage capacity of the catalyst.

At 330, method 300 includes determining if catalyst monitoring exit conditions are met. Catalyst monitoring exit conditions may be based on an amount of time that the catalyst monitor has been running while the engine pull-down is inhibited and DFSO is enabled. In some examples, the engine pull-down may be inhibited for a duration less than a threshold duration so that vehicle operation is not significantly impacted by keeping the engine on for a duration after a pull-down request. Further, in some examples, catalyst monitoring exit conditions may be based on whether the catalyst monitor has completed or has acquired sufficient data to effectively diagnose the catalyst. If catalyst monitoring exit conditions are not met at 330, method 300 continues performing the catalyst monitor at 328.

However, if catalyst monitoring exit conditions are met at 330, method 300 proceeds to 318 to discontinue inhibiting the engine pull-down. For example, the engine may be shut down after the monitoring test is complete while the vehicle is still in operation. For example, after the catalyst monitor is complete, engine operation to propel the vehicle may be discontinued and an auxiliary power source in the hybrid vehicle may instead be used to propel the vehicle at a non-zero speed or to keep the vehicle in operation.

Further, if an indication of catalyst degradation, e.g., if an age of the catalyst is greater than a threshold or if a storage capacity of the catalyst is less than a storage threshold, was found during the catalyst test, then, in some examples, a notification may be sent to an onboard diagnostic device or an error code may be set to alert the driver of the vehicle to perform maintenance operations.

FIG. 4 illustrates an example method, such as method 300 described above, for operating a hybrid vehicle to inhibit engine pull-downs during select vehicle operating conditions in order to perform exhaust sensor and catalyst monitoring tests. At 402, FIG. 4 shows an example graph of vehicle speed as a function of time. At 404, FIG. 4 shows an example graph of engine operation, e.g., whether the engine is on or off, as a function of time. At 406, FIG. 4 shows commanded DFSO, e.g., whether DFSO is enabled (on) or not enabled (off), as a function of time. At 408, FIG. 4 shows example air/fuel readings of an exhaust sensor positioned downstream of a catalyst in the exhaust, e.g., CMS 179 positioned downstream of catalyst 178. At 410, FIG. 4 shows example air/fuel readings of an exhaust sensor positioned upstream of the catalyst in the exhaust, e.g., air/fuel sensor 128.

Before time t0 in FIG. 4, the vehicle is operated in an engine-on mode where the engine is used to at least partially propel the vehicle. During this time, as indicated in the graph at 402, vehicle speed is less than the second threshold speed v2. For example, below this second threshold speed, engine pull-downs may not be inhibited.

At time t0, an engine pull-down request occurs. For example, a driver of the vehicle may perform a tip-out to initiate an engine shut-off event at t0. As indicated in graph 404, the engine is shut down at t0 and the vehicle is operated using an auxiliary power source between time t0 and t1 while the engine is deactivated. However, since the vehicle speed is below the threshold speed v1 between time t0 and t1, engine pull-downs are not postponed and diagnostic tests are not performed on exhaust components during this time.

At time t1 an engine pull-up request occurs. For example, at time t1 a driver may perform a tip-in to request an increased amount of torque. Thus at t1, the engine is activated to meet the torque demand. Between time t1 and t2, the vehicle speed increases above the threshold speed v2 and at t2 an engine pull-down request occurs, e.g., a driver of the vehicle may again tip-out. In this case, since the vehicle speed is greater than speed threshold v2 and both the CMS and A/F sensor are readings are rich, as indicated in graphs 408 and 410, respectively, then the catalyst monitor may be initiated so that the engine pull-down is inhibited and DFSO is enabled. The catalyst monitor is then performed between times t2 and t3 while the engine pull-down is postponed and DFSO is enabled. At t3, exit conditions for the catalyst monitor are met, e.g., the catalyst monitor has completed or a threshold time duration has passed. Thus at t3, the engine pull-down is no longer postponed and the engine is shut-down.

At t4, an engine pull-up again occurs, e.g., in response to a driver tip-in, so that the engine is activated to meet requested torque demands. Between time t4 and t5, the vehicle speed increases above the first threshold speed v1 which is greater than the second threshold speed v2. At t5, a pull-down request is again performed, e.g., the driver performs a tip-out, and since the vehicle speed is greater than v2, the sensor monitor may be initiated to postpone the engine pull down and enable DFSO. Readings from the A/F sensor shown at 410 between time t5 and t6 may then be used to diagnose the sensor. At time t6, exit conditions for the sensor test are met and the engine pull down is no longer postponed so that the engine again shuts down at t6.

By operating a hybrid vehicle to inhibit engine pull-downs during select vehicle operating conditions in order to perform exhaust sensor and catalyst monitoring tests while enabling DFSO, as described above, diagnostic routines may be performed using DFSO to adequately expose exhaust sensors to rich and lean air/fuel mixtures in order to more accurately diagnose exhaust system components while reducing intrusiveness of the monitoring routines on vehicle operation. Further, in such an approach, fuel economy may be increased by inhibiting engine pull-downs only when the diagnostic monitors are ready. Further, by not causing the engine to stay on below threshold speeds, customer satisfaction with hybrid vehicle operation may increase.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid vehicle with an engine, comprising:
   inhibiting engine shutdown and enabling deceleration fuel shut off to perform a monitoring test while a vehicle speed is above a threshold speed,
   the monitoring test including monitoring a rich to lean transition upstream and downstream of a catalyst in an exhaust of the vehicle, inhibiting engine shutdown when exhaust gas sensors upstream and downstream of the catalyst are reading rich, and not inhibiting engine shutdown when exhaust gas sensors upstream and downstream of the catalyst are reading lean.

2. The method of claim 1, wherein inhibiting engine shutdown to perform the monitoring test is performed in response to an engine pull-down request while the engine is running and an engine temperature is greater than a threshold temperature.

3. The method of claim 2, wherein the engine pull-down request is generated in response to a driver tip-out.

4. The method of claim 1, further comprising shutting down the engine after the monitoring test is complete.

5. The method of claim 1, wherein the monitoring test includes monitoring a rich to lean transition at an air/fuel sensor in the exhaust of the vehicle.

6. The method of claim 5, further comprising indicating sensor degradation in response to the rich to lean transition at the air/fuel sensor.

7. The method of claim 1, further comprising indicating catalyst degradation in response to the rich to lean transition downstream of the catalyst.

8. The method of claim 1, further comprising:
   in response to an engine pull-down request when a vehicle speed is greater than a first threshold speed:
     inhibiting engine shutdown;
     enabling deceleration fuel shut off;
     monitoring a rich to lean transition at an air/fuel sensor in the exhaust of the vehicle; and
     indicating sensor degradation based on the rich to lean transition at the air/fuel sensor; and
   in response to an engine pull-down request when a vehicle speed is greater than a second threshold speed which is less than the first threshold speed:
     inhibiting engine shutdown;
     enabling deceleration fuel shut off;
     monitoring a rich to lean transition upstream and downstream of the catalyst in the exhaust of the vehicle; and
     indicating catalyst degradation based on the rich to lean transition upstream and downstream of the catalyst.

9. A method for a hybrid vehicle, comprising:
   in response to an engine pull-down request when a vehicle speed is greater than a threshold speed:
     inhibiting engine shutdown;
     enabling deceleration fuel shut off with the engine still spinning;
     monitoring a rich to lean transition in an exhaust of the vehicle, including monitoring a rich to lean transition upstream and downstream of a catalyst in the exhaust of the vehicle where engine shutdown is inhibited in response to exhaust gas sensors upstream and downstream of the catalyst reading rich and not inhibiting engine shutdown when exhaust gas sensors upstream and downstream of the catalyst are reading lean; and
     indicating a degradation based on the rich to lean transition.

10. The method of claim 9, wherein the engine pull-down request includes a driver tip-out.

11. The method of claim 9, further comprising shutting down the engine after monitoring the rich to lean transition for a duration if the request is still present.

12. The method of claim 9, wherein monitoring a rich to lean transition in an exhaust of the vehicle includes monitoring a rich to lean transition at an air/fuel sensor in the exhaust of the vehicle.

13. The method of claim 9, further comprising not inhibiting engine shutdown while an engine shutdown has been inhibited for a duration greater than a threshold.

14. A method for a hybrid vehicle, comprising:
   in response to an engine pull-down request when a vehicle speed is greater than a first threshold speed:
     inhibiting engine shutdown;
     enabling deceleration fuel shut off;

monitoring a rich to lean transition at an air/fuel sensor in an exhaust of the vehicle;

indicating sensor degradation based on the rich to lean transition at the air/fuel sensor; and shutting down the engine after monitoring the rich to lean transition at the air/fuel sensor for a duration; and in response to an engine pull-down request when the vehicle speed is greater than a second threshold speed which is less than the first threshold speed:

inhibiting engine shutdown;

enabling deceleration fuel shut off;

monitoring a rich to lean transition upstream and downstream of a catalyst in the exhaust of the vehicle where engine shutdown is inhibited in response to exhaust gas sensors upstream and downstream of the catalyst reading rich and not inhibiting engine shutdown when exhaust gas sensors upstream and downstream of the catalyst are reading lean; and indicating catalyst degradation based on the rich to lean transition upstream and downstream of the catalyst; and shutting down the engine after monitoring the rich to lean transition upstream and downstream of the catalyst for a duration.

15. The method of claim 14, wherein the engine pull-down request is a driver tip-out.

16. The method of claim 14, wherein the vehicle is a plug-in hybrid electric vehicle.

\* \* \* \* \*